March 16, 1948. E. M. BRUNNER ET AL 2,437,935
RADIOLOGICAL MEASUREMENT OF THE PERMEABILITY OF POROUS MEDIA
Filed May 7, 1945
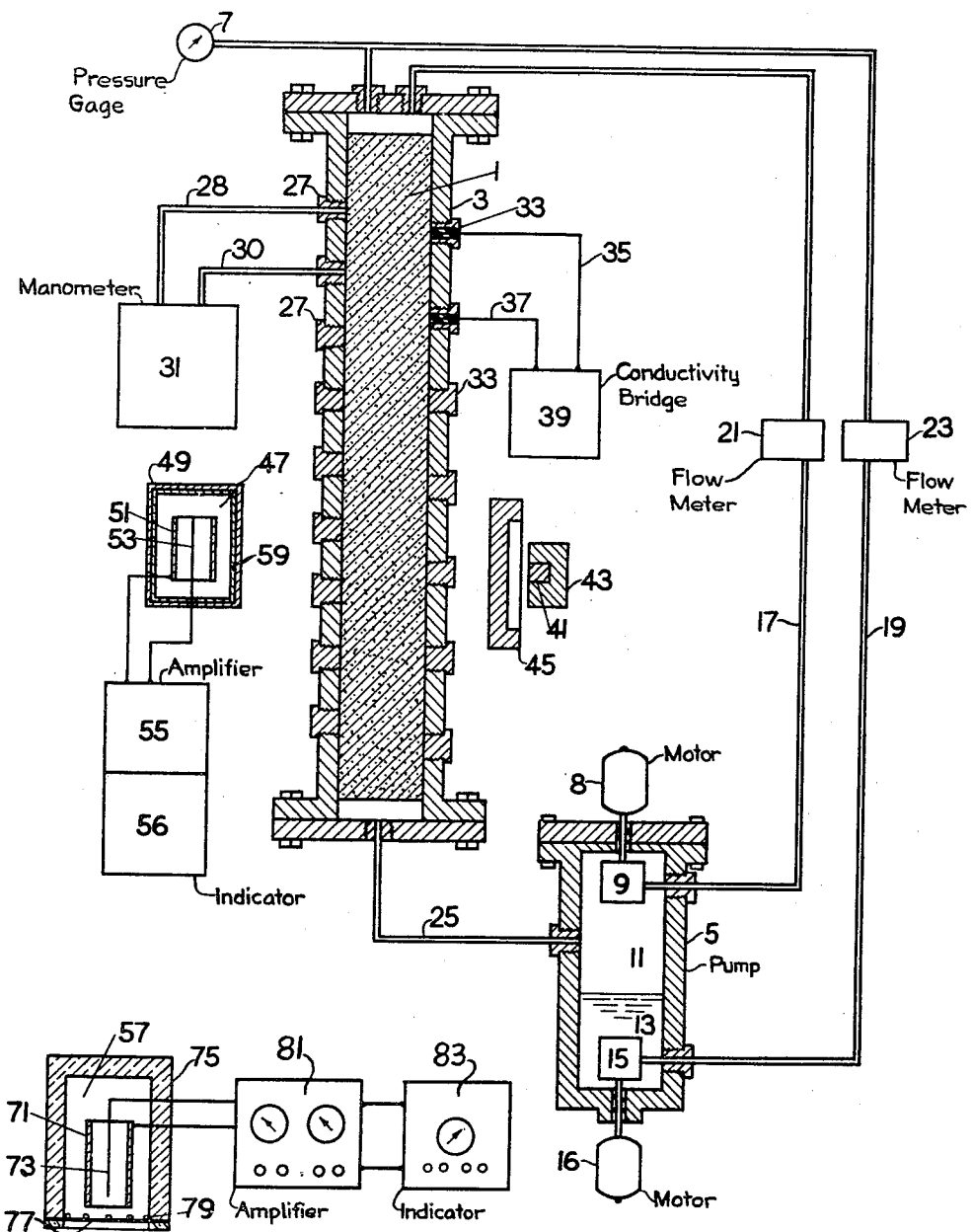
Figure I
Figure II
Inventors: E. M. Brunner
E. S. Mardock
By their Attorney:

Patented Mar. 16, 1948

2,437,935

UNITED STATES PATENT OFFICE 2,437,935

RADIOLOGICAL MEASUREMENT OF THE PERMEABILITY OF POROUS MEDIA

Eugene M. Brunner, El Cerrito, and Edwin S. Mardock, Berkeley, Calif., assignors to Shell Development Company, San Francisco, Calif., a corporation of Delaware Application May 7, 1945, Serial No. 592,512

8 Claims. (Cl. 250—83)

This invention pertains to a system for the measurement of the permeability of porous bodies, such as specimens or cores of rock, sand, etc., to the flow of fluids under polyphase flow conditions, and relates more particularly to a radiological system for effecting these measurements at high pressures similar to those actually prevailing in underground formations. This application is a continuation in part of application Serial No. 587,598, filed April 10, 1945.

The permeability of a porous medium to a homogeneous or single-phase fluid flow, as defined by Darcy's law, is directly proportional to the rate of flow of the fluid per unit area and to the viscosity of the fluid, and inversely proportional to the pressure gradient.

The effective permeability of a porous medium is the permeability of the medium to one fluid phase of a multi-phase system which exists in the medium when a plurality of fluid phases simultaneously flow or are present therein. The effective permeability is a function of the percentage saturation of the medium with respect to all fluid phases present therein.

The relative permeability of a porous medium to one fluid phase of a multi-phase system existing in the medium at definite percentages saturation of fluid phases is defined as the effective permeability when the latter is expressed as the ratio of the effective permeability to permeability.

Since underground mineral oil reservoirs normally present complex systems wherein oil, gas and water are simultaneously present in a porous medium, it is of essential importance in petroleum production operations to effect measurements from which permeability, effective permeability and relative permeability values may be calculated.

Permeability determinations are readily effected in a manner well known in the art. Effective permeabilities and relative permeabilities can likewise be readily determined, after effecting the necessary measurements, from the following expressions:

$$Krfs = \frac{Kfs}{K}$$

$$Krfs = \frac{Qs/Ps}{Q/P}$$

wherein:

$K$ is the permeability;
$Kfs$ is the effective permeability to a fluid $f$ for a percent of saturation $s$;
$Krfs$ is the relative permeability to a fluid $f$ for a percent of saturation $s$;
$Q$ is the fluid flow rate for a 100 percent saturation;
$Qs$ is the fluid flow rate for a percent of saturation $s$;
$P$ is the pressure difference across the porous body for a 100 percent saturation;
$Ps$ is the pressure difference across the porous body for a percent of saturation $s$.

The determination of effective and relative permeabilities of a porous medium to a predetermined fluid thus normally involves the step of measuring the degree of saturation of said porous medium with regard to said fluid.

Different methods and apparatus have been used for measuring saturations of porous media at atmospheric pressures. Saturations, and especially saturations with regard to electrically non-conductive fluids, cannot however be readily measured by means of said methods and apparatus at elevated pressures, and especially at such high pressures as 4000 or 5000 lbs. per sq. in. commonly prevailing in underground reservoirs. Permeability measurements effected heretofore are thus defective in referring only to atmospheric conditions, and not to true conditions of pressure prevailing in underground petroleum reservoirs.

It is therefore an object of this invention to provide a method for effecting measurements necessary for the determination of effective and relative permeabilities of a porous medium at elevated pressures under conditions of polyphase flow. In the present application the term "polyphase flow" will be defined as referring to the flow of a fluid through a porous medium when at least one other fluid is present in or flows through said porous medium, and the term "plurality of fluids" will be defined as referring to two or more fluids.

It is also an object of this invention to provide a method and an apparatus for effecting these measurements by radiological means.

It is also an object of this invention to provide a method and apparatus for determining the saturation of a porous body with regard to a fluid containing hydrogen atoms by subjecting said body and the fluid therein to neutron bombardment and detecting and registering the number of neutrons slowed down by collision with hydrogen atoms within said body.

It is also an object of this invention to provide a method and apparatus whereby the relative permeability of a porous body with regard to either of two immiscible fluids simultaneously present therein, both of said fluids containing hydrogen atoms, can be determined.

These and other objects of this invention will be understood from the following description taken with reference to the attached drawing, wherein:

Figure 1 is a diagrammatic view showing the general arrangement of apparatus used in practicing the present invention;

Figure 2 is a diagrammatic view of an alternative type of the radiological part of the apparatus shown in Figure 1.

Figure 1 diagrammatically represents a porous body or core 1, whose effective and relative permeabilities it is desired to measure at high pressures, such as 1000 to 5000 or more pounds per sq. in. The core is hermetically encased in a high-pressure holder or housing 3, capable of withstanding such pressures.

A high-pressure pump unit or housing 5 is used to circulate any desired number of fluid phases through the core 1 at any desired pressure indicated by the gage 7. Thus, gas from the upper space 11 within the pump unit 5 may be circulated by a pump element or impeller 9, driven by a motor 8, while oil from the lower space 13 is similarly circulated by the pump 15 driven by motor 16. The gas and oil pass through pipes or conduits 17 and 19, provided with flow meters 21 and 23, respectively, are forced through the core 1, and return by means of pipe or conduit 25 to the pump unit, wherein they separate into the layers or phases 11 and 13 by gravity settling.

It is obvious that, instead of gas and oil, the fluid phases may comprise gas and water or brine, oil and water or brine, or any other fluids. More than two fluid phases may likewise be forced simultaneously through the core housing by using additional pump units or elements similar to those shown in the drawing and connected in the same manner to the core housing.

The core housing 3 is provided with a plurality of longitudinally spaced pressure plugs or connections 27, whereby fluid communication may be selectively established, for example by means of conduits 28 and 30, between the space within the housing and a manometer 31 in order to determine the pressure drop occurring across any desired length of the core 1 during the flow of the fluid phases therethrough. The manometer 31 may advantageously be of the mercury capacity bridge type.

The core housing 3 is likewise provided with a second set of longitudinally spaced electrical connector plugs 33, whereby electrical connections may be selectively established, for example by means of conductors 35 and 37, with an electrical indicating device 39, in order to measure the resistance of any predetermined length of the core 1 at any degree of saturation with regard to an electrically conductive fluid. The device 39 may be advantageously of the conductivity bridge type.

The apparatus of the present invention further comprises a source of neutron rays or particles, such for example as a radium-beryllium mixture 41, held in a lead container 43, adapted to be positioned in close proximity to the core housing 3. A lead shield 45 may be interposed between the neutron source and the core holder in order to prevent radiations of any type except neutrons from penetrating the latter.

Placed in any desired angular or spacial relationship with regard to the core housing and the neutron source, but likewise in close proximity to the core holder, is a neutron detector diagrammatically shown at 47. The neutron detector may be of the Geiger-Mueller counter or of the ionization chamber type. These devices generally comprise a pressure-tight envelope 49 made of a material such as glass, containing a suitable gaseous medium and enclosing two spaced electrodes 51 and 53. Ionizing radioactive particles penetrating the detector cause electric currents or pulses to flow between the electrodes 51 and 53, which currents are amplified by means of the amplifier and power supply 55 and are registered by means of the indicating device 56. Since neutrons have no electrical charge thereon and have therefore no ionizing properties, ordinary Geiger counters or ionization chambers may be modified for purposes of neutron detection by filling them with a gas such as boron trifluoride, or by placing in close proximity to the electrodes 51 and 53 a material such as cadmium, lithium, boron, etc., which has the property of disintegrating under the impact of slow neutrons with an accompanying emission of ionizing particles such as alphas or gammas capable of causing a current flow between the electrodes of the detector. A layer comprising one of the above elements is shown at 59 applied as a coating on the wall 49 of the detector.

The operation of the present invention will be understood from the following description:

With the pump unit or units operating to force a desired polyphase flow through the core, the values which it is necessary to measure in order to determine the effective and relative permeabilities of the core with regard to one predetermined phase at a predetermined percent of saturation of the core are as follows:

1. The rate of flow of said fluid phase at said predetermined percent of saturation and at a 100 percent saturation;

2. The pressure drop across the core produced by said fluid flow at said percent of saturation and at a 100 percent saturation.

The rate of flow of either of the fluid phases shown in Figure 1 can be readily measured by means of the flow meters 21 and 23, and the pressure drop across the core or any section or length thereof can likewise be readily measured by the manometer 31. The difficulty arises only in measuring the particular saturations at which these flow and pressure drop measurements are made, no means having heretofore been known for accurately measuring the saturation of a core hermetically enclosed in a high-pressure container with regard to an electrically non-conductive fluid.

It may be additionally noted that it is not always actually necessary to measure 100 percent saturation values, since these values can be readily obtained by extrapolation after any other desired saturation values have been obtained and the apparatus has been properly calibrated.

According to the present invention, the desired core saturations are measured by radiological means involving the step of bombarding the core 1 with neutrons.

Neutrons may be produced or generated by the action of a radioactive substance such as radium, radon, polonium, etc., on a substance such as beryllium, lithium, etc. For example, beryllium emits neutrons when impinged upon by alpha particles emanating from radium. A radium-beryllium mixture is therefore a convenient source of neutrons. The neutrons emitted by any such source have an extremely high velocity, corresponding to an energy value averaging between $1 \times 10^6$ and $10 \times 10^6$ electron volts, and are called fast neutrons. Fast neutrons have the property of passing freely through heavy elements, that is, elements of heavy atomic weight, which are not previous to any considerable depth to radiations of other types, such as alpha, beta and even gamma rays. On the other hand, light elements, that is, elements of low atomic weight, and especially hydrogen, have the property of greatly decreasing the velocity of the neutrons. Neutrons whose velocity has been reduced by collision with low atomic weight elements are known as slow neutrons. The passage of neutrons through substances comprising high atomic weight elements thus results principally in scattering or diffusing these neutrons, while a passage of neutrons through substances comprising low atomic weight elements results in both slowing down and scattering said neutrons.

Since neutrons carry no electric charge, they cannot be directly detected by ordinary means used for the detection of other radioactive radiations, such more specifically as Geiger-Mueller counters and ionization chambers. However, certain elements or compounds thereof, such as cadmium, lithium, boron, boron trifluoride, etc., which are substantially insensitive to the effect of fast neutrons, have the property of disintegrating with an accompanying emission of alpha or gamma particles when impinged upon by slow neutrons. By placing such elements in the vicinity of Geiger counter or ionization chamber detectors, for example, by coating their walls with cadmium, or by filling them with boron trifluoride, these detectors may be applied for the detection of slow neutrons and will be referred to hereinbelow as neutron detectors. Since, for a neutron radiation source of a given intensity, the number of slow neutrons reaching such detector will be substantially a function of the amount of the hydrogen atoms present in the medium traversed by the path of neutrons to the detector, this amount can be accurately measured by observing or recording the indications of a properly calibrated detector of this type. This method can therefore be advantageously used for determining the presence of substances containing free or combining hydrogen, such as water, hydrocarbon liquids or gases, etc., in cases where more direct measurements are for some reason difficult or impossible.

To determine, therefore, an unknown percent of saturation of the core 1 with regard to any particular fluid phase, for example, a mineral oil circulated through the core as one component of a multiphase flow system, it is only necessary to obtain the number of counts registered by the indicator 5, and to refer this number to a calibration curve obtained by calibration tests run while maintaining the core under fixed known conditions of saturation and pressure.

It has however been found that measurements or determinations made in the manner described above are not always reliable or accurate, due to the fact that sources of neutrons, such as radium-beryllium mixture, actually emit not only neutrons but also radiations of other types. Thus, while the beryllium of such a mixture emits, under the influence of radium, a neutron radiation, the radium itself simultaneously emits alpha, beta and gamma radiations. The response of a neutron detector, comprising for example a Geiger-Mueller counter, is therefore partially due in such cases to the effect of slow neutrons on the disintegrating element, such as cadmium, placed about the counter, and partially to the direct effect of gamma rays from the same source on the counter itself. Since the use of lead filters of prohibitive thickness may be required to decrease the intensity of gamma radiation to a permissible level and to differentiate between the detector response due to neutrons and that due to gamma-ray leakage, the indications of said detectors may in certain cases lack the accuracy desired with regard to quantitative hydrogen atom measurements. It is therefore preferred to use the following more accurate method of carrying out the present invention.

As stated above, slow neutrons, upon striking certain elements, knock off or cause the emission of gamma particles, as in the case of cadmium, or alpha particles as in the case of boron or lithium. This may be termed the immediate effect of slow neutron bombardment. Some other elements, however, such as silver, indium and rhodium, do not lose any radiactive particle immediately upon being subjected to neutron impact. Instead, these elements, upon receiving a neutron in their atom structure, are converted to an isotopic form. Isotopes have a different atomic weight, but the same electric charge per atom as the original matter. This isotopic form being unstable, these elements tend to undergo, within a certain statistical time period, a further change to a more stable form. This conversion or deactivation from one isotopic form to another is accompanied by the emission of ionizing particles, and more specifically of beta-particles, and the periods through which it takes place vary for different elements. The use of the elements listed above is especially advantageous, because their deactivation half-life periods are well adapted for laboratory measurements. Thus, for example, silver has a shorter period with a half-life of 22 seconds, and a longer period with a half-life of 2.3 minutes. This may be termed the delayed effect of neutron bombardment. This delayed effect may be utilized in the following manner for the purposes of the present invention:

With the core, core housing and radioactive source arranged as shown in Figure 1, the detecting apparatus comprising units 47, 55 and 56 is removed and replaced by a test plate such as shown at 61 in Figure 2, which test plate may be provided with a holder 63, made of any suitable metal or plastic material. The lead shield 45 for the radioactive source may likewise be dispensed with. The test plate 61 is made of or comprises an element capable of undergoing suitable isotopic changes under the effect of neutron bombardment, such as rhodium, indium or silver. As stated above, the radiation from source 41 comprises fast neutrons and gamma rays. The gamma rays are of no consequence for the present method, and cannot furthermore have any harmful action on a detector, the detector 47 having been removed from the vicinity of the radioactive source and the core. The fast neutrons penetrate the core housing 3 and the core 1, being subjected therein to a scattering effect by collision with heavy atoms and being at the same time converted to slow neutrons by collision with the hydrogen atoms of the liquid saturating the core 1. The slow neutrons, scattering in all directions from core 1, impinge upon the plate 61 and activate said plate by transforming the metallic element thereof into an isotope. This activation phase or period is continued until the plate 61 is activated substantially as fully as desired. Since the activation of an element proceeds asymptotically at approximately the same rate as its subsequent deactivation, that is, its conversion to a more stable form upon the removal of the effects of the energizing source, the activation period may conveniently be selected on the basis of the half-life period values of the element of plate 61. Generally, it has been found convenient to select a suitable value in round figures for the activation period to eliminate timing errors. Thus an activation period of 5 minutes may be used for rhodium or silver.

When the plate 61 has been substantially completely activated, it is removed from the proximity of the apparatus of Figure 1, and is arranged to act on the detecting and measuring apparatus of Figure 2, which is sufficiently remote from the sphere of action of source 41 to be free from any radioactive effects of the latter.

The plate 61 is placed in close proximity to a detector 57, such as a Geiger-Mueller counter or an ionization chamber. As the plate 61, being removed from the effects of the source 41, undergoes its isotopic change or changes, accompanied by the specific emission of ionizing beta particles, these beta particles penetrate the detector 57, causing the latter to give its conventional response in the form of a current or current pulses, passing between the cathode 71 and the anode 73 thereof. Although any type of Geiger-Mueller tube or ionization chamber may be used for the purposes of this invention, it may be noted that since the penetration power of the beta particles, on which the operativeness of this method is based, is extremely small as compared with that of neutron or gamma radiations, the use of counters or chambers having the usual fairly thick glass or metallic walls, such as shown at 75, should be avoided, and a detector having at least one thin wall or portion thereof, made of a material readily pervious to beta particles, such for example as mica, should be used instead. Such a mica wall or window is schematically shown at 77, being supported for mechanical strength by a metallic lattice work 79.

The current or current pulses or discharges originating in the tube 57 are transmitted to an amplifier unit 81, which comprises also a power unit supplying the necessary operating voltages for both the tube 57 and the amplifying and indicating circuits. The amplified pulses are then transmitted to an indicating unit 83, which indicates, registers or records the current or the number of pulses received throughout a predetermined time interval. Since the number of such pulses per unit time may sometimes be relatively high, tending to overload the apparatus, the indicating unit may be provided with a scaling unit adjustably adapted to indicate certain predetermined multiples of said pulses, for example every 4th, 8th, 16th, etc., pulse.

Since the number of pulses produced by the tube or chamber 57 in a predetermined time period is proportional to the degree of activation of the plate 61, which is in turn proportional to the amount of slow neutrons which have impinged upon said plate during the activation period, and since the number of said slow neutrons formed by collision with hydrogen atoms is a function of the number of said hydrogen atoms, and therefore of the quantities of the hydrogen-containing fluid or fluids saturating the core, the degree of saturation can be easily determined by the present method after properly calibrating the apparatus in the manner fully described in said copending application Serial No. 587,598.

It is understood that the plate 61 and the detectors 47 and 57 may have an desirable shape or construction without departing from the spirit of this invention. Thus, another manner in which the present method may be carried out consists in arranging an activated plate within the detector itself, instead of placing it close to the detector but exteriorly thereof as shown in Figure 2. Thus, the cathode 71 of the detector may be made of one of the suitable elements mentioned above, such as rhodium, indium or silver. In such cases the detector 57 together, if desired, with the units 81 and 83 is positioned during the activation period close to the core 1, for example in substantially the same position as detector 47 in Figure 1, and is subjected to the action of the source 41, the power unit 81 being switched off at this time, so that the cathode 71 is not energized and acts only as a test plate. At the end of the activation period, the source 41 is removed to a place sufficiently distant to eliminate any further action on the detector, the electrical circuits of units 57, 81 and 83 are switched to an operative position, and the count is thereupon taken in the manner described above throughout a predetermined deactivation time period.

The object of the conductivity bridge 39, shown in Figure 1, is as follows: in cases where more than two fluid phases are simultaneously circulated through the core 1, or where one liquid containing hydrogen atoms, such as mineral oil, is circulated through the core 1 by means of the pump element 9, while a second liquid containing hydrogen atoms, such as a brine, is simultaneously circulated through the same core by means of the pump element 15, it is not possible to determine the relative saturation of the core with regard to each of said liquids separately by using only the radiological portion of the apparatus forming the present system, since the count obtained therefrom will give only the total saturation of the core by the two liquids without differentiating between the effects due to each of said liquids individually.

In such cases, therefore, the total saturation of the core by the two liquids is determined radiologically in the manner described hereinabove, and conductivity readings are additionally taken across any desired portion of the core, that is, between connections established to the conductivity bridge from any two desired plugs 33. Since the conductivity of the core will depend on its saturation with regard to an electrically conductive liquid such as brine, this saturation with regard to brine may thus be separately measured by means of the conductivity bridge 39, after said bridge has been properly calibrated for different percentages of saturation in a manner similar to that already referred to hereinabove. The satuation with regard to the non-conductive liquid, such as oil, may then be calculated by subtracting the value of the brine saturation from the total saturation value obtained by radiological means.

We claim as our invention:

1. In a method for determining the permeability at high pressures of a porous body with regard to a fluid flowing therethrough under polyphase flow conditions, the steps of confining said body in a zone maintained at a high pressure, simultaneously saturating said body with a plurality of fluid phases, at least one of said phases being a fluid containing hydrogen atoms, causing a fluid flow through said body, measuring the rate of said fluid flow, measuring the pressure drop occurring during said flow between points in said body spaced from each other along the line of said flow, subjecting said body to neutron radiation, detecting the neutrons slowed down within said body by collison with hydrogen atoms, and determining the saturation of said body with regard to said hydrogen containing fluid from the amount of the detected slow neutrons.

2. In a method for determining the effective permeability at high pressures of a porous body with regard to a fluid flowing therethrough under polyphase flow conditions, the steps of confining said body in a zone maintained at a high pressure, causing a plurality of fluids to flow simultaneously through said body, at least one of said fluids containing hydrogen atoms, measuring the rate of flow of each of said fluids, measuring the pressure drop occurring during said flow between points in said body spaced from each other along the line of said flow, subjecting said body to radiation by fast neutrons, detecting the neutrons scattering from said body as slow neutrons after collision with hydrogen atoms within said body, indicating said slow neutrons, and determining the saturation of said body with regard to said hydrogen containing fluid from the indicated amount of said slow neutrons.

3. In a method for determining the effective permeability at high pressures of a porous body with regard to a fluid flowing therethrough under polyphase flow conditions, the steps of confining said body in a zone maintained at a high pressure, causing a plurality of fluids to flow simultaneously through said body, at least one of said fluids containing hydrogen atoms, measuring the rate of flow of each of said fluids, measuring the pressure drop occurring during said flow between points in said body spaced from each other along the line of said flow, subjecting said body to radiation by fast neutrons, causing neutrons slowed down by collision within said body with hydrogen atoms to activate an element positioned exteriorly of said high pressure zone and in close proximity to said body, said element being capable of undergoing isotopic changes under the effect of slow neutrons, discontinuing said neutron radiation, and determining the saturation of said body with regard to said hydrogen containing fluid by measuring the degree of activation of said element.

4. In a method for determining the permeability at high pressures of a porous body with regard to a fluid flowing therethrough under polyphase flow conditions, the steps of confining said body in a zone maintained at a high pressure, causing a plurality of fluids to flow simultaneously through said body, two of said fluids containing hydrogen atoms, one of said two fluids being an electrolytic conductor and the other being a non-conductor, measuring the rates of flow of all of said fluids, measuring the drop of pressure occurring during said flow between points in said body spaced from each other along the line of said flow, determining the saturation of said body with regard to said conductive fluid by measuring the electrical resistance between two spaced points in said body, subjecting said body to neutron radiation, indicating the number of neutrons slowed down within said body by collision with hydrogen atoms, determining the saturation of said body with regard to said two hydrogen containing fluids from the indicated amount of slow neutrons, and determining the saturation of said body with regard to said non-conductive fluid by subtracting from said total saturation the saturation of said body determined with regard to said conductive fluid.

5. In an apparatus for determining the permeability at high pressures of a porous body with regard to a fluid flowing therethrough under polyphase flow conditions, the combination of a fluid-tight housing adapted to receive a core, said housing being adapted to withstand high internal pressures, normally closed pressure plugs longitudinally spaced from each other along said housing, manometer means, conduit means connected through said plugs between said manometer means and the space within said housing, a pump adapted to circulate a fluid phase containing hydrogen atoms through the core in said housing, conduit means between the exhaust of said pump with one end of said core housing, flow meter means in said conduit means, conduit means between the other end of said core housing and the intake of the pump, a source of neutrons removably positioned in close proximity to the core housing, and means for detecting and indicating the amount of neutrons penetrating said core and scattered therefrom as slow neutrons after collision with hydrogen atoms within said core.

6. In an apparatus for determining the permeability at high pressures of a porous body with regard to a fluid flowing therethrough under polyphase flow conditions, the combination of a fluid-tight housing adapted to receive a core, said housing being adapted to withstand high internal pressures, normally closed pressure plugs longitudinally spaced from each other along said housing, manometer means, conduit means connected through said plugs between said manometer means and the space within said housing, a pump housing adapted to hold a plurality of fluid phases separated into layers by gravity, at least one of said fluid phases containing hydrogen atoms, pumping elements each immersed in one of said phases, conduit means connecting the exhaust of each of said pumping elements with one end of said core housing for separately conveying said fluid phases thereto, flow meter means in each of said conduits, conduit means between the other end of the core housing and the pump housing for returning thereto the fluids flowing through the core in said first housing, a source of neutrons removably positioned in close proximity to the core housing, and means for detecting and indicating the amount of neutrons penetrating said core and scattered therefrom as slow neutrons after collision with hydrogen atoms within said core.

7. In an apparatus for determining the permeability at high pressures of a porous body with regard to a fluid flowing therethrough under polyphase flow conditions, the combination of an elongated fluidtight housing adapted to receive a core, said housing being adapted to withstand high internal pressures, a plurality of normally closed pressure plugs longitudinally spaced from each other along said housing, manometer means, conduit means selectively connected through said plugs between said manometer means and the space within said housing, a plurality of electrical connector plugs longitudinally spaced from each other along said housing, an electrical bridge measuring device, conductor means adapted to be selectively connected between said plugs and said measuring device, a pump housing adapted to hold a plurality of fluid phases separated into layers by gravity, at least one of said fluid phases containing hydrogen atoms, pumping elements each immersed in one of said phases, conduit means connecting the exhaust of each of said pumping elements with one end of said core housing for separately conveying said fluid phases thereto, flow meter means in each of said conduits, conduit means between the other end of the core housing and the pump housing for returning thereto the fluids flowing through the core in said first housing, a source of neutrons removably positioned in close proximity to the core housing, and means for detecting and indicating the amount of neutrons penetrating said core and scattered therefrom as slow neutrons after collision with hydrogen atoms within said core.

8. In a method for determining the permeability at high pressure of a porous body with regard to a fluid flowing therethrough, the steps of confining said body in a high pressure zone, saturating said body with a fluid phase containing hydrogen atoms, causing a fluid flow through said body, measuring the rate of said flow, measuring the pressure drop occurring during said flow between points in said body spaced from each other along the line of said flow, subjecting said body to neutron radiation, detecting the neutrons slowed down within said body by collision with hydrogen atoms, and determining the saturation of said body with regard to said hydrogen-containing fluid from the measured amount of the slow neutrons.

EUGENE M. BRUNNER.
EDWIN S. MARDOCK.

REFERENCES CITED

The following references are of record in the file of this patent:

UNITED STATES PATENTS

| Number | Name | Date |
|---|---|---|
| 2,220,509 | Brons | Nov. 5, 1940 |
| 2,288,718 | Kallmann et al. | July 7, 1942 |